Figure 7:
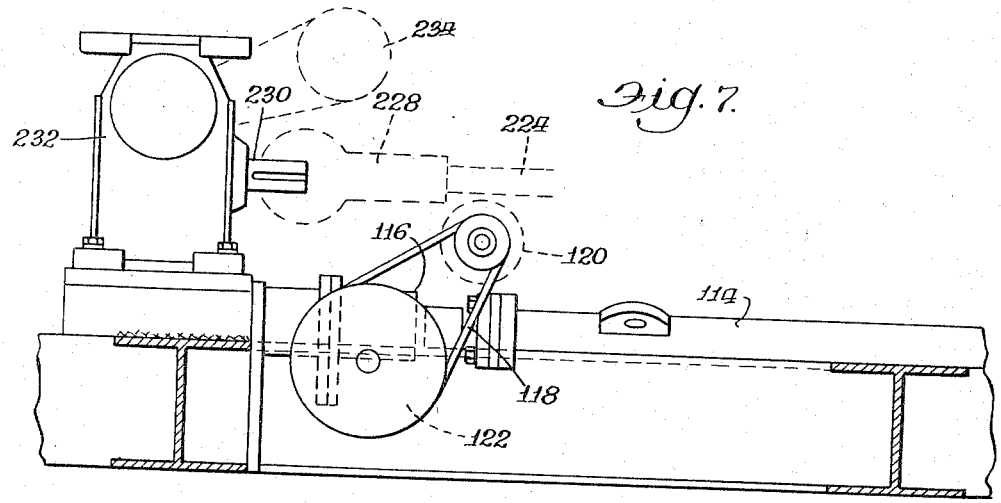

May 30, 1967  C. K. SMITH  3,322,291
PIPE HANDLING CONVEYOR
Filed Aug. 22, 1966  6 Sheets-Sheet 1
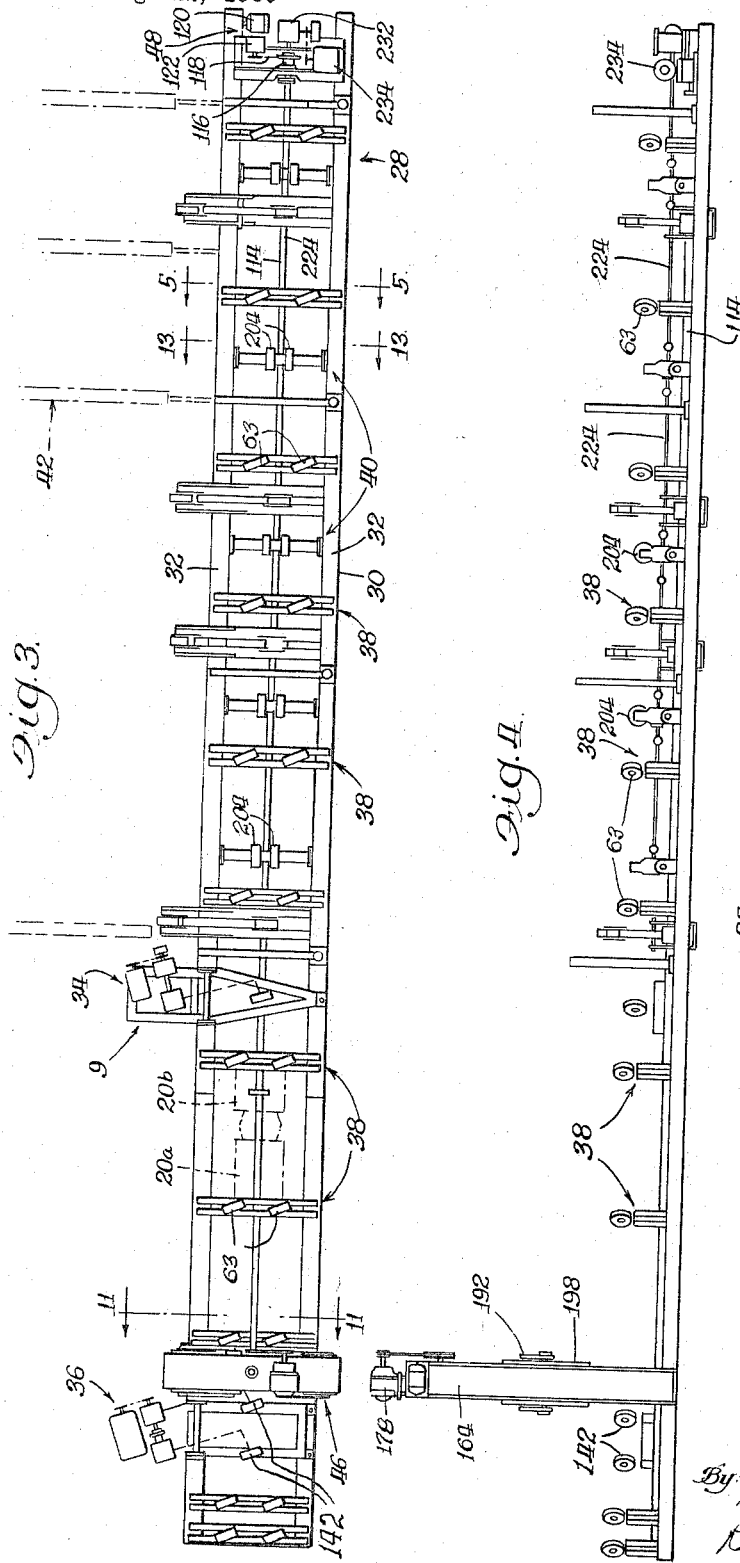
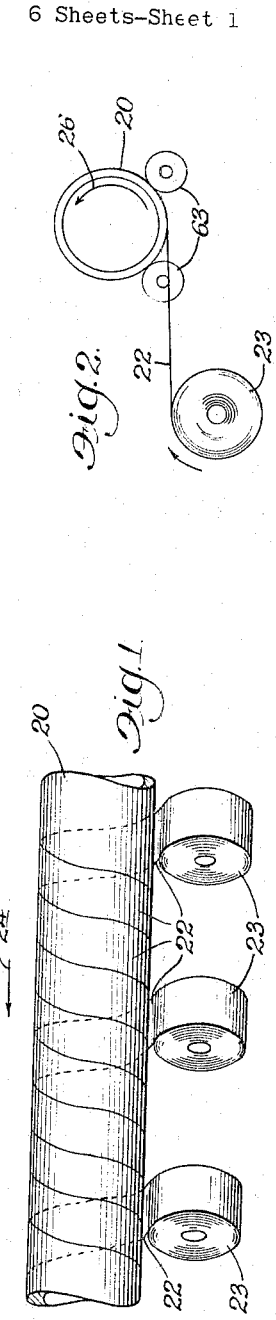
Inventor:
Carl K. Smith
By Walter F. Schlegel, Jr.
Ralph D. Faust
Attys

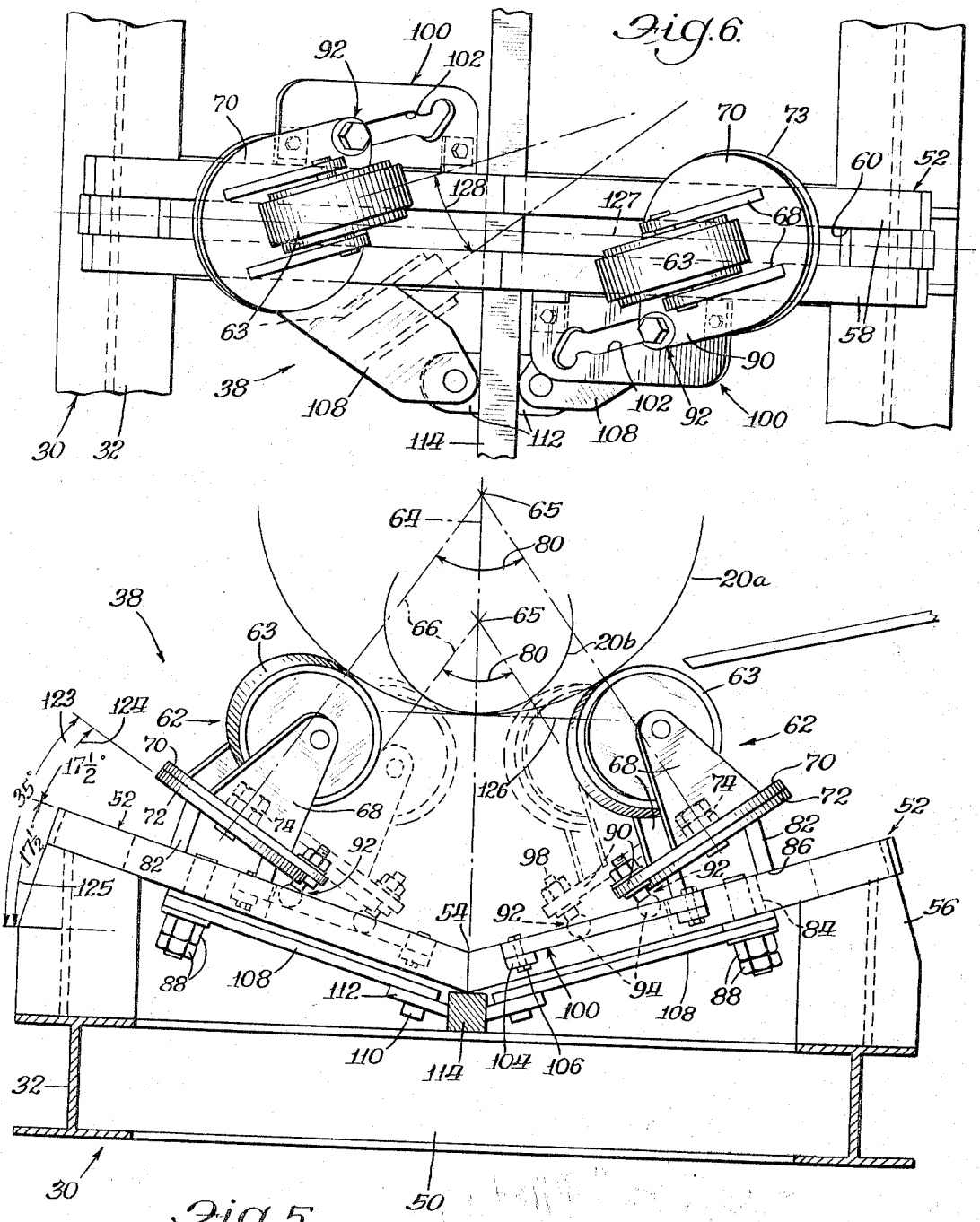

May 30, 1967 C. K. SMITH 3,322,291
PIPE HANDLING CONVEYOR
Filed Aug. 22, 1966 6 Sheets-Sheet 3

Inventor:
Carl K. Smith

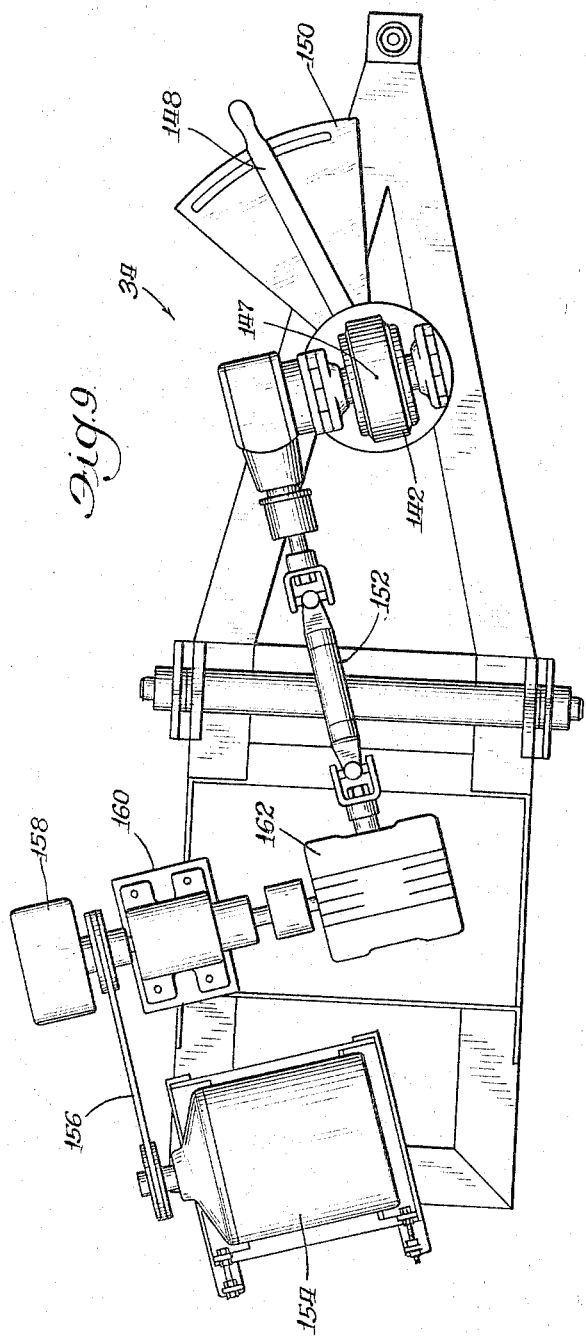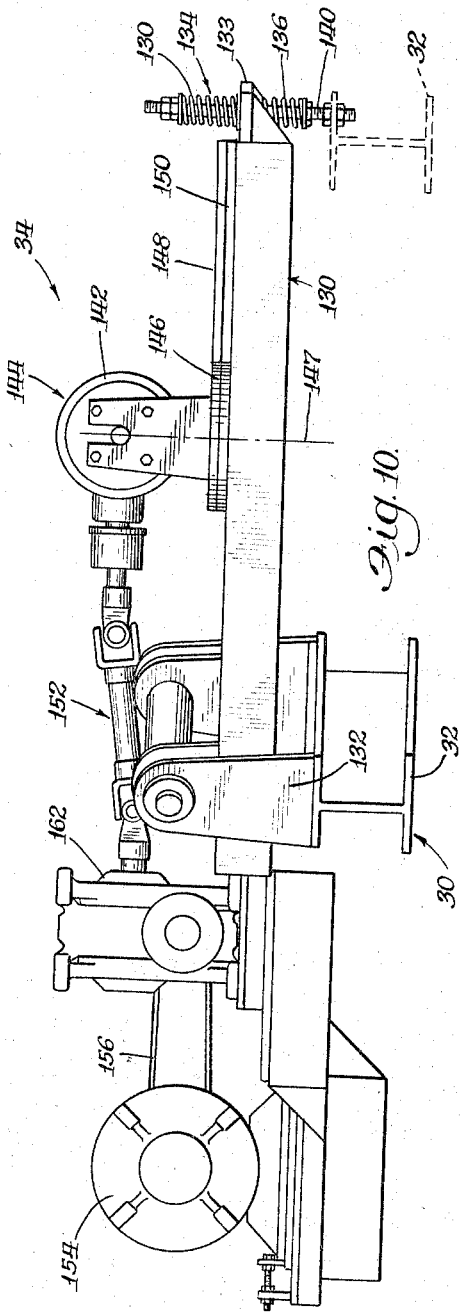

Inventor:
Carl K. Smith

Inventor:
Carl K. Smith

United States Patent Office 3,322,291
Patented May 30, 1967

3,322,291
PIPE HANDLING CONVEYOR
Carl K. Smith, Mathis, Tex., assignor to Amsted Industries Incorporated, Chicago, Ill., a corporation of New Jersey
Filed Aug. 22, 1966, Ser. No. 574,174
23 Claims. (Cl. 214—339)

The present invention relates to a pipe handling conveyor.

Pipe handling conveyors of the kind to which the present invention is applicable are, in general, known, and are utilized for conveying pipes in helical paths about their own longitudinal axes, for such operations as applying a wrapping or coating to the pipes, or for cleaning them. The function of the apparatus in both kinds of operation are essentially the same and the following disclosure has particular reference to applying a wrapping to a pipe, but of course it is not limited thereto and is equally applicable to a cleaning operation.

Wrappings on the pipe are customarily applied in continuous strips wound helically on the pipe, and in applying the wrapping, the pipe is moved in a helical path, and moves axially in each revolution a distance equivalent or substantially equal to the width of the wrapping strip being applied. The pipe is supported by rollers arranged at an angle to the longitudinal axes of the pipe to accommodate the spiral path in which they engage the pipe and follow, relatively, therearound, but in the adjustment of the apparatus to accommodate different size pipes, the rollers are adjusted toward and from the vertical axial center plane of the pipe so that the rollers, when positioned for accommodating one diameter of pipe, are properly positioned when relocated to accommodate another diameter size pipe.

A broad object of the present invention is to provide a novel pipe handling conveyor, having adjusting means for accommodating different diameters of pipe which include the supporting rollers referred to, and in making the adjustments, the rollers are moved not only toward and from each other, but are also angularly repositioned.

Another object is to provide a pipe handling conveyor of the character just referred to having a plurality of supporting rollers, and novel means for adjusting all the rollers in unison.

Another and more specific object is to provide in a pipe handling conveyor of the above character, single actuating means, such as power means, for making the adjustments in the rollers, which as correlated functions, adjust the rollers toward and from each other and individually in angular directions.

A still further object is to provide a pipe handling conveyor of the foregoing character in which cam means is provided for adjusting the rollers angularly in response to the adjustments thereof toward and from each other.

A still more specific object is to provide a pipe handling conveyor of the foregoing character in which the cam means referred to is replaceable whereby single cam means may be utilized for a series of different sizes of pipe, but may be replaced by other cam means for accommodating not only different sizes of pipe, but other factors in the handling of the pipes such as speed of movement, both axial and rotational, as well as the width of the strip of wrapping applied thereto.

Still another object is to provide a pipe handling conveyor of the foregoing character having hold down means engageable with the upper surface of the pipe for assisting in supporting the pipe in certain positions of the latter, in which rollers are provided for engaging the pipe and are movable toward and from each other to accommodate different diameter pipes, and also which are adjusted angularly in response to their movement toward and from each other.

An additional object is to provide in apparatus of the foregoing character novel means for driving pipes through the conveyor.

Still another object is to provide in apparatus of the above character novel high speed means for carrying pipe linearly to facilitate connecting successive sections together, and a novel arrangement to selectively bring into operation such high speed drive means and the spiral drive means.

Figure 8:
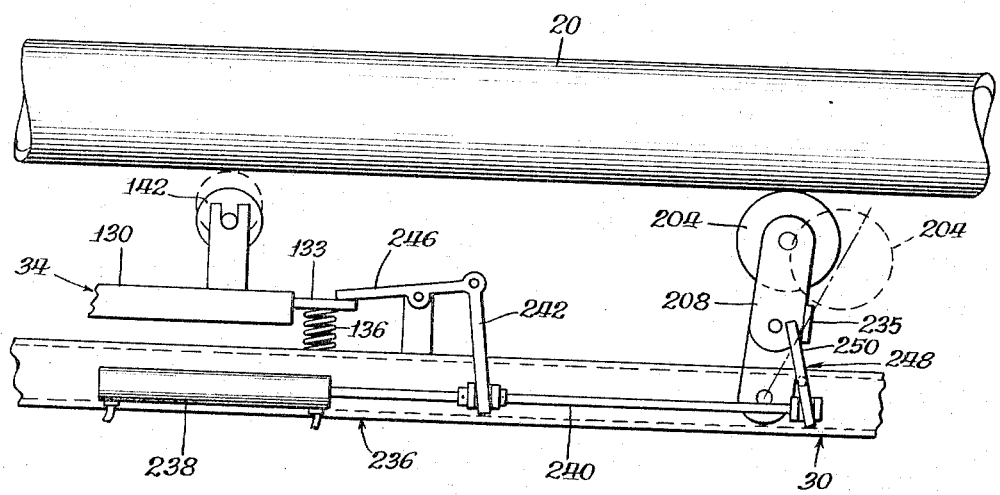
Figure 11:
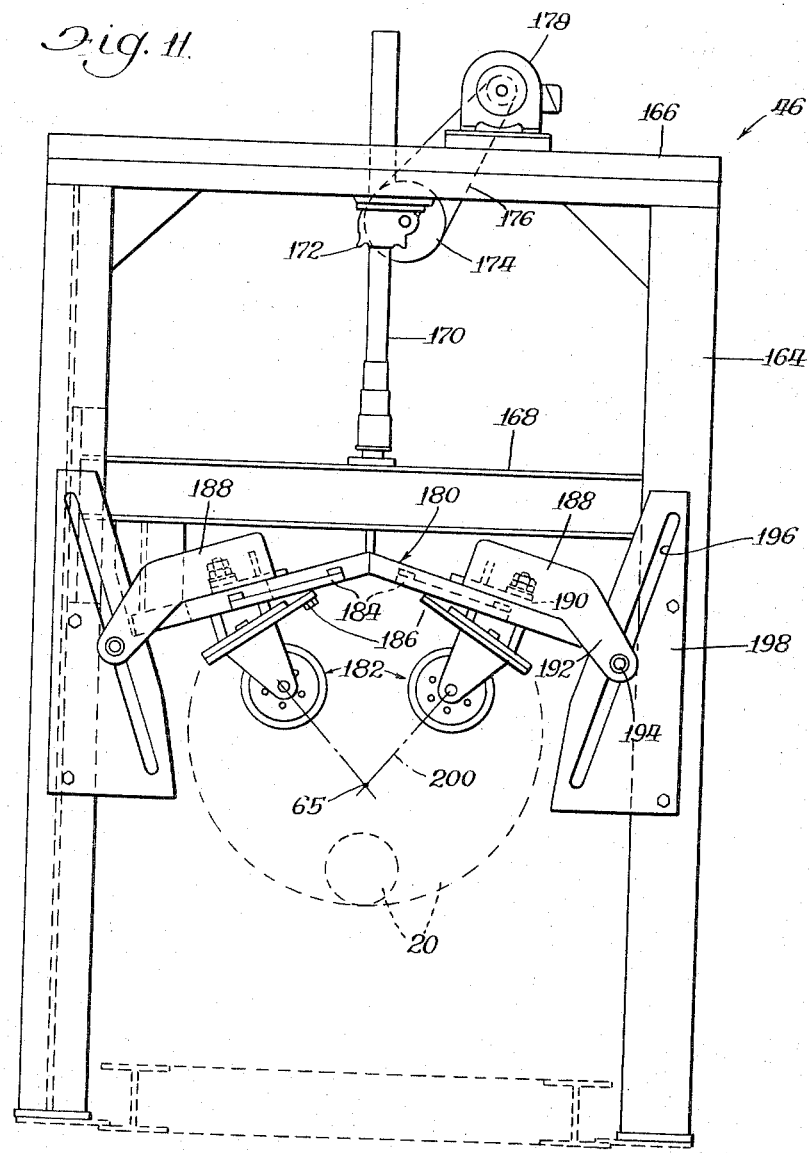
Figure 12:
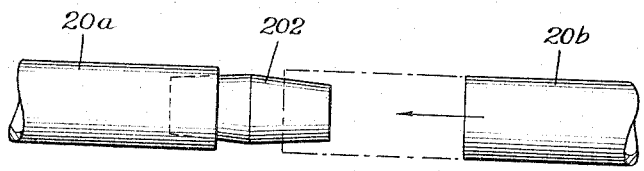
Figure 13:
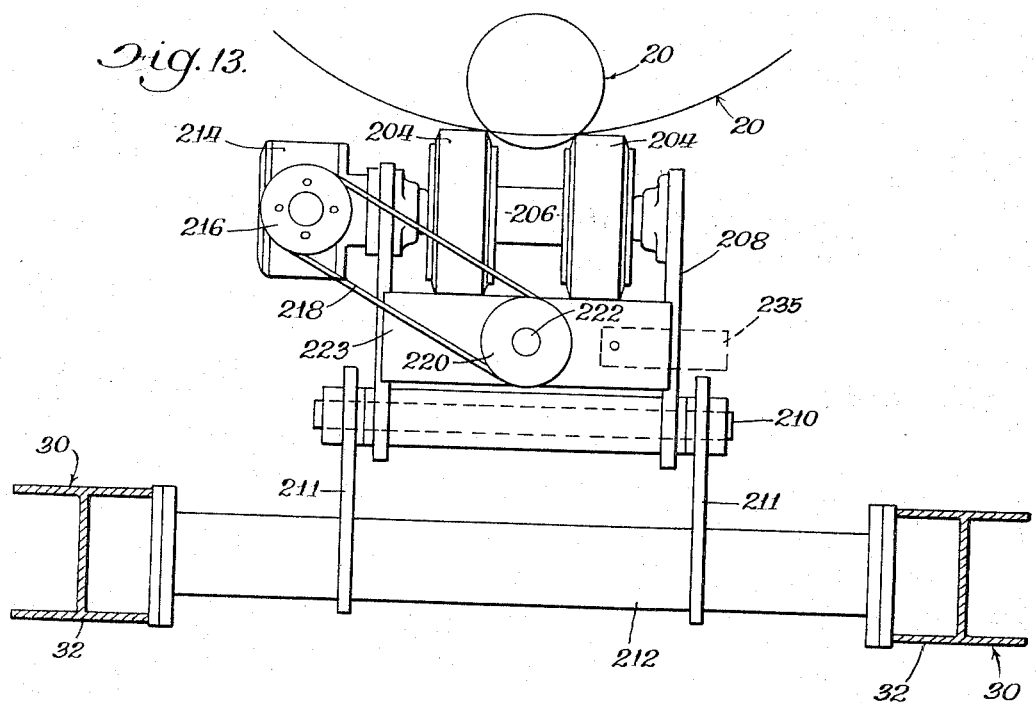
Figure 14:
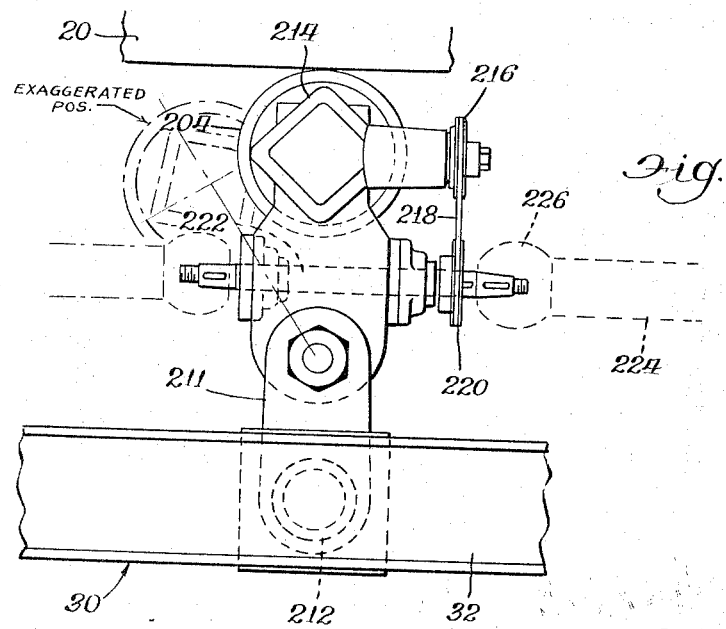

Other objects and advantages of the invention will appear from the following detail description taken in conjunction with the accompanying drawings wherein:

FIGURE 1 is a semi-diagrammatic view indicating the application of wrapping to a pipe;
FIGURE 2 is also a diagrammatic view, from the right of FIGURE 1, and showing support rollers for the pipe;
FIGURE 3 is a plan view of apparatus made according to the invention;
FIGURE 4 is a side view of the apparatus;
FIGURE 5 is a large scale view taken at line 5—5 of FIGURE 3, and showing details not shown in the latter view;
FIGURE 6 is a view from the top of FIGURE 5;
FIGURE 7 is a view taken at line 7—7 of FIGURE 3;
FIGURE 8 is a diagrammatic view of means for advancing the pipe axially, and means for advancing it helically, and their interrelation in enabling selective operation thereof;
FIGURE 9 is a large scale view of a drive unit, 9, included in FIGURE 3;
FIGURE 10 is a side view of the unit shown in FIGURE 9;
FIGURE 11 is a large scale view taken at line 11—11 of FIGURE 3;
FIGURE 12 is a detail view of means for connecting pipe sections together;
FIGURE 13 is a large scale view taken at line 13—13 of FIGURE 3; and
FIGURE 14 is an end view taken from the left of FIGURE 13.

Referring now in detail to the accompanying drawings, FIGURE 1 shows a pipe 20 to be conveyed in the apparatus of the invention, and treated according to whether it is to be wrapped, or cleaned, etc. In accordance with the disclosed example of the use of the apparatus, i.e., wrapping or coating, the wrapping is provided in strips 22, which may be any number as in this case three, and provided in rolls 23. The pipe 20 is moved axially or linearly, which in the example assumed herein is to the left as indicated by the arrow 24, and rotated counterclockwise as viewed in FIGURE 2, as indicated by the arrow 26. The strips 22 preferably are drawn from the top of the rolls and applied to the pipe at the bottom of the latter, these last two features being utilized for convenience. In accordance with the preferred arrangement, the pipes 20, regardless of their diameters are all supported with their bottom extremities at a common level for facility in applying the coating-wrapping.

Referring to FIGURES 2 and 3 showing the conveyor apparatus as a whole, the conveyor is indicated in its entirety at 28 and includes a frame or base 30 which includes a pair of side rails or members 32, together with other elements to be identified hereinbelow. The frame 30 extends the full length of the conveyor which may be in the neighborhood of 50 to 60 feet. Among the principal components of the conveyor are drive units 34 and 36 for driving the pipe in helical direction, and support units 38 for directly supporting the pipe and accommodating its spiral movement. Other components include axial or linear drive units 40 for advancing the pipe axially without rotating it. Associated with the apparatus is means, indicated diagrammatically at 42, for supporting pipe for feeding it into the conveyor apparatus, the pipe being, for example, rolled from this supporting means sideways into the conveyor. Suitable means of known kind are provided for controlling the movement of the pipe from the support means 42 into the conveyor. A supplementary support means 46 is included in the apparatus, for assisting in supporting the pipe at its trailing end as the pipe is leaving the conveyor means. Finally power means 48 is provided, having two separate power units, for operating and controlling various other elements in the conveyor.

FIGURES 5 and 6 show the detail construction of the supporting units 38 which may be of any convenient number, such as ten, in the length of conveyor referred to. At each supporting unit 38 is a cross piece 50 secured as by welding to the side rails or frame elements 32. The unit includes a subframe 52 extending across and supported by the main frame 30, and of V-shape as viewed longitudinally of the conveyor, having a lowermost point 54 and its outer ends elevated and supported by insert pieces 56 resting on the side rails 32. The subframe 52 includes a pair of spaced elements 58 (FIGURE 6) extending across the conveyor and defining a space 60 therebetween. The unit 38 includes a pair of idler roller assemblies 62 which are in all material respects identical in construction and arranged oppositely or symmetrically. These roller assemblies include rollers 63 which directly support the pipe 20 and form cradle means for so supporting it, the rollers being on opposite sides of a vertical plane 64 containing the longitudinal axis 65 of the pipe. These roller assemblies are movable toward and from each other, as referred to above for accommodating different diameters of pipe (see relatively large and small pipes 20a and 20b) and they are adjusted angularly about axes 66 coinciding with radii of the pipe, in response to their being adjusted toward and from each other. Each roller 63 is mounted in lugs 68 secured to a plate 70 pivotally mounted on another plate 72 by pivot means indicated generally at 74 for the angular adjustments of the roller about the axes 66. The axes 66 of the two rollers are perpendicular to the axis 65 of the pipe, as indicated, the angle 80 between these axes 66 to be referred to again hereinbelow.

The plates 70 and 72 are fitted flat together and the lower plate is mounted on a support 82 having a lower portion 84 riding in the space 60 and guided by the marginal edges thereof, having a shoulder 86 engaging and supported by the upper surface of the frame 52. Suitable means 88 is provided for securing the support 82 in position on the subframe 52, and enabling sliding movement of the roller assemblies in the space or slot 60.

The upper plate 70 is provided with a laterally or radially extending lug 90 in which is mounted a cam follower 92. The cam follower includes an element 94 on its extended end, having a spherical main surface and mounted on a shank 96 supported in the lug 90 by suitable means indicated at 98.

Included in the construction of the unit 38 is a cam plate 100 having a cam slot 102 of certain characteristic shape, to be referred to hereinbelow, and extending generally longitudinally of the respective arm of the subframe 52. This cam slot receives the spherical element 94 of the cam follower, and pursuant to movement of the roller assembly 62 inwardly and outwardly, as referred to hereinbelow, the roller assembly (and the roller) is adjusted angularly about the axes 66. The cam plate 100 is preferably demountably secured in place as on lugs 104 fixed to the subframe 52 by suitable detachable means, such as bolt and nut means 106. The cam plate 100 is therefore removable and replaceable by other cam plates having other shapes of cam slots for accomplishing correspondingly different angular movements of the roller units.

A roller positioning link or arm 108 is pivotally mounted at its outer end in the securing means 88 and pivotally secured at its inner end as at 110 on a lug 112 fixedly secured to a traverse bar 114 extending longitudinally throughout substantially the length of the entire conveyor. The links or arms 108 of both roller assemblies 62 of all of the units 38 in the conveyor are thus connected with the traverse bar 114, and upon shifting movement of the bar, as described hereinbelow, the roller assemblies 62 are moved toward and from each other, and pursuant thereto and as a consequence of that movement are angularly adjusted about their axes 66 to accommodate different helical paths on the pipes, as will be described more fully hereinbelow.

The traverse bar 114 may conveniently rest on the series of cross pieces 50 of the frame 30 and it extends into the power assembly 48 (see also FIGURE 7) which includes a number of elements or components of conventional nature for producing the shifting movement of the bar. The end of the bar is screw threadedly received in a rotatable sleeve 116 mounted in the frame 30 and rotated through a belt or chain 118 by a motor 120 acting on a gear box 122. Upon rotation of the motor and consequent rotation of the sleeve 116, the traverse bar 114, through its screw threaded connection with the sleeve 116, is moved longitudinally of the conveyor, in corresponding direction and acting through the links or arms 108, moves the roller assemblies 62 outwardly or inwardly, depending upon the direction of movement of the traverse bar, by the outward projection or inward retraction of those links or arms. Upon such outward and inward movement of the roller assemblies, the rollers are adjusted angularly about the axes 66 by virtue of the follower elements 94 working in the cam slots 102. These cam slots by changes in direction longitudinally of the conveyor produce the desired angular adjustments of the rollers. The specific shape of the cam slots need not be described in detail, their shape being individually predetermined according to the desired angular adjustments of the roller. These adjustments vary according to the different diameters of pipes involved, as well as other factors, as will be referred to again hereinbelow.

As indicated above, the pipe is supported entirely by the rollers 63 throughout the major portion of the handling of the pipe through the conveyor, but with certain exceptions, as referred to hereinbelow. In so supporting the pipe 20, both of the rollers are disposed under the pipe and spaced apart for most effectively supporting the pipe. If the rollers are too close together there is a tendency for the pipe to move or roll or bounce off of the rollers in its rotational movements, while on the other hand, if they are spaced too far apart, there is wedging effect of the pipe between the rollers. It has been found that if the rollers are spaced apart relative to the size of the pipe involved so that the angle 80 is in the range of for example 60–90°, satisfactory results have been accomplished. It has also been found that such an angle of 70° is most satisfactory, and in the present illustration such angle of 70° is illustrated. Hence regardless of the size of pipe accommodated, the angle 80 will be at the same value, namely 70°. To accomplish this, the roller assemblies 62 are moved outwardly or inwardly the desired amount to position them at such relative angle, according to the size of pipe accommodated, and the axes 66 of the roller assemblies will always intersect the axis 65 of the pipe and be perpendicular thereto. For example, in the case of a large pipe individually identified as 20a in FIGURE 5, the axis 65 thereof is in a relatively elevated position and the axes of the roller assemblies intersect that axis. In the case of the smaller pipe 20b, the roller assemblies 62 are moved inwardly to the dotted line position, and in this position, the axes 66 again intersect the axis of the pipe, the latter in this case being in a relatively lowered position.

The plates 70 are disposed perpendicular to the axes 66 of the roller assemblies so as to maintain the relation between the roller assemblies and those axes in all positions of the rollers angularly about those axes, and in all positions of the roller assemblies toward and from each other. In such arrangement each plate 70 is disposed at an angle 123 with the horizontal which is equal to one-half of the angle 80 and in the case assumed 35°. Additionally, it is preferred that the angle 124 between the plate 70 and the corresponding leg of the subframe 52 be one-half of the angle 123, and in the present case 17½°, leaving the angle 125 between the leg of the subframe and the horizontal also 17½°, the latter relation between the angles 124 and 125 facilitating positioning of the roller assemblies in relation to the pipes of different diameters.

Regardless of the diameter of the pipe being handled, the angle 80 is constant, in the case assumed 70°, which is represented by the two positions of the axes 66 in FIGURE 5. Additionally, regardless of the diameter of the pipe and corresponding positions of the roller assemblies, the axes 66 pass through the axial center of the rollers, and the axes of the mounting pins 74. Furthermore, regardless of the diameter of the pipe being handled, the pipe is maintained with its bottom surface at a constant line indicated at 126 for convenience in applying the wrapping which as indicated in FIGURE 2 is led from the top or the roll 23 of material to the bottom of the pipe.

The rollers 63 of each unit or set 38 are disposed at opposite angles relative to a vertical transverse plane 127 (FIGURE 6) and the cam plates 100 are on opposite sides of the roller assemblies relative to that plane. This angularity of the rollers accommodates the helical movement of the pipe thereacross, and is predetermined according to not only the diameter of the pipe, but other factors as well, including the linear speed of travel and the rotational speed, the latter two speeds together being predetermined according to the width of the strip of wrapper material being applied to the pipe. For example, in any given diameter of pipe, the pipe would travel linearly at a greater rate in applying 8" material than in applying 6" material, and the rollers 63 are therefore positioned at the proper angle to accommodate the speed of the pipe as well as its diameter. Accordingly, the cam slots 102 are predetermined in shape according to the factors referred to above in the application of the wrapper. For example, it may be desired to apply the same size wrapper, i.e., 6" strip to both an 8" pipe and a 12" pipe, and in this case the angularity of the rollers would be different in those two cases. It may be desired to apply a 6" strip to a 12" pipe and an 8" strip to an 18" pipe, whereby it will be seen that the proportion between the diameters of these two pipes and the width of the strips is not constant, and the rollers would be disposed at different angles in those two cases.

The cam slots 102 are therefore shaped according to a given set of factors in the case of each diameter of pipe in the range that can be accommodated. This is an empirical shape for the desired sets of characteristics and circumstances to be accommodated. The provision for removing the cam plates and replacing them with others provides practically an infinite combination of possibilities for accommodating any size pipe within the range that can be accommodated as well as any size wrapper material and, of course, any speed of travel of the pipe. An angle between different positions of a roller, as viewed in plan, is indicated at 128 in FIGURE 6. The angular movement of the plate 70 about its axes 66 causes the cam follower 94 to follow a line that is not parallel with the leg of the subframe 52 (as viewed in FIGURE 5), and the sphericity of the cam follower element 94 provides for uniform relation in the engagement of the cam follower with the surfaces of the cam slot.

Attention is next directed to the power units or driving units 34 and 36. These units are similar and only one will be described in detail. Referring to FIGURES 9 and 10 which show the unit 34, a frame 130 is pivoted adjacent its midpoint in lugs 132 mounted on one of the side frame members 32. The frame extends across the main frame 30 of the conveyor where at one end 133 it is mounted in spring means 134 secured in the side frame member 32 at that side of the conveyor. The spring means 134 includes a lower compression spring 136 and an upper compression spring 138 working against corresponding sides of the frame 130 and surrounding a pin or rod 140 directly secured in the side frame member 32. These frames tend to retain the corresponding end of the unit in an adjusted position, but enabling the unit to lower as described hereinbelow.

A spin-up or driving roller 142 is provided in a roller assembly indicated in its entirety at 144 of suitable construction. The roller assembly includes a plate 146 pivotally mounted on the frame 130 for a limited angular movement about a vertical axis 147. This plate is provided with a manually actuated lever 148 cooperating with a plate 150 for releasably securing the lever in adjusted position corresponding to adjusted positions of the roller 142 angularly about the axis 147. The roller unit is connected with a driving component or link 152 which is both extensible and universal in character. This component is driven by a driver 154 preferably a variable speed electric motor working through a belt 156, a sheave 158, transmission 160 and a gear box 162. These units 154-162 are of suitable and known kind and may be mounted in fixed position. For convenience these units are mounted on an extension of the frame 130 that extends laterally beyond the main portion of the conveyor.

The driver roller 142 is positioned for engaging the pipe at the bottom and upon rotation of the roller, the pipe is rotated, and due to the angularity of the roller which is disposed at the appropriate angle, the pipe is driven in a helical path. The roller is positioned at the predetermined angle by setting the lever 148. The extensibility of the link 152 and the universal character thereof enable such positioning of the roller unit relative to the fixed position of the motor 154 and intermediate units.

The unit 34 is disposed in such position that the spring 136 normally retains the corresponding end of the frame 130 in elevated position for establishing and maintaining friction engagement of the roller 142 with the pipe, but yieldingly so, to enable the pipe to rest fully on the idler rollers 63 of the units 38. Additionally, the spring means 134 accommodates unevenness in the pipe, such as out-of-round shape, including projections and depressions, as well as bends, etc. The spring means 134 also enable the unit to be rocked downwardly to move the roller 142 out of engagement with the pipe when it is desired to move the pipe linearly through the conveyor as referred to below.

The drive unit 36 (FIGURE 3) is similar to the unit 34 except that it has two driving rollers 142 instead of a single such roller as the unit 34. The rollers 142 may be moved angularly by separate levers, or in a tandem arrangement by a single lever as desired. The driving operation of the unit 36 is similar to that of the unit 34, but due to other factors, it is desired to provide greater driving force for purposes not entering into the present invention. In the case of unit 36, its frame may be fixed at both sides of the conveyor, if desired.

The support unit or hold-down means 46 is disposed adjacent the exit end of the conveyor (FIGURES 3 and 4) and engages the pipe on the upper surface for aiding in supporting the pipe as it is leaving the conveyor, counteracting the tendency of the leading end of the pipe, beyond the conveyor, to drop. The unit 46 is shown in detail in FIGURE 11, and as there shown includes a pair of side posts 164 which may be supported directly on the floor, outwardly of the conveyor. The unit includes a head 166 and a roller frame 168 mounted for vertical sliding movement in the posts. Connected to the roller frame is a threaded shaft 170 threadedly engaging screw means in a unit 172 mounted on the head 166 and including a driven pulley 174 on which is trained a belt or chain 176 driven by a driver 178, such as an electric motor, mounted on the head 166. Upon operation of the motor, acting through the screw in the unit 172 and through the shaft 170, the roller frame 168 is raised or lowered.

Mounted on the roller frame is a subframe 180 of inverted V-shape on which are mounted a pair of roller assemblies 182 for movement toward and from each other. This arrangement is similar to that described above in connection with the units 38 except that the guide unit is in inverted position, and the roller assemblies are moved inwardly and outwardly by a different means. In the present case the subframe 180 and roller assemblies 182 together with the cam plates 184 and cam follower means 186 are identical or similar in construction to the corresponding members of the units 38, namely 52, 62, 100 and 92.

The roller assemblies are moved both inwardly and outwardly by side arms 188 preferably U-shape in construction, having a web element 190 engaging the subframe 180, and serving as the element to which the roller assemblies 182 are directly mounted. These side arms have extensions 192 with cam followers therein in the form of guide pins 194 in their extended ends and riding in diagonal slots 196 in cam plates 198. Preferably the cam plates are two in number at each side of the conveyor, the plates being on opposite sides of the posts 164. Each of the side arms 188 have two extensions 192 corresponding to the cam plates, as will be seen in FIGURES 3 and 4. The roller frame 168, and the members mounted thereon, are adjusted vertically and preset according to the diameter of the pipe to be handled, two sizes of which are indicated in FIGURE 11, this vertical adjustment being made, of course, by operating the motor 178. Upon such vertical movement, the side arms 188 are moved inwardly and outwardly under the control of the cam slots 196, and the rollers engage the pipe at a position relative to each other such that the axes 200 corresponding to the axes 66 always intersect the axis 65 of the pipe, and due to the control of the cam plates 184, the rollers are moved to the desired angle according to the factors involved in the spiral path of the pipe as described above in connection with the unit 38. The cam slots 196 may be straight with a horizontal component directly proportional to the vertical movement of the unit. However, the slots in the cam plates 184 are shaped according to considerations discussed above in connection with the cam slots 102 for predetermining the angles of the roller assemblies about their axes 200.

As the pipe is leaving the conveyor, the unit 46, in engaging the upper surface of the pipe through the rollers, holds down the trailing end of the pipe and supports the leading end against dropping, the rollers of the roller assemblies 182 following the spiral path on the pipe in the manner described above.

The linear drive units 40 are utilized for feeding the sections of pipe in linear direction (FIGURES 3 and 4), without rotating them, for bringing up each section into position for connecting it with the preceding section, this manner of feeding in the sections being in general known. FIGURE 12 indicates diagrammatically this manner of feeding and connecting the pipe sections. In that figure, a leading section 20a is being wrapped and fed through the conveyor by the driving unit 34. A double wedge plug 202 is fitted in the trailing end of each section, and as the trailing end passes through the conveyor, and reaches a position indicated in FIGURE 3, the next succeeding section 20b is fed up rapidly to a position close to, but spaced a short distance from, the preceding section. This rapid linear feeding movement is provided by the units 40, and after it reaches such position, the units 40 are deactivated and brought out of engagement with the pipe. The pipe is then fed further, in helical direction, by the spin-up roller 142 of the unit 34 which is actuated at a speed faster than the speed of the section ahead of it until the succeeding pipe section engages the plug 202 and is frictionally secured thereto. Thereafter the speed of unit 34 is reduced to coincide with the speed of the unit 36.

Each unit 40, the details of which are shown best in FIGURES 13 and 14, includes a pair of rollers 204 known as "endo" rollers mounted on a shaft 206 which in turn is mounted in a pair of links 208 pivotally mounted on a shaft 210 mounted in brackets 211 fixed to a transverse piece 212 secured to the side members 32 of the frame 30. The shaft 206 on which the rollers are mounted is driven through a gear box 214, a driven pulley 216, a belt 218 and a driving pulley 220, the latter mounted on a shaft 222 rotatably mounted in elements 223 secured to the links 208.

Interconnecting the shafts 222 in the succession of units 40 are shaft sections 224 (FIGURES 4 and 7) connected to the shafts 222 through universal joints 226. The end-most shaft section 224 at the leading end of the conveyor (right end of FIGURES 3 and 4) is connected through a universal and sliding joint connection 228 (FIGURE 7) in turn connected with the shaft 230 forming the output unit of a gear box 232 driven by a driver 234 which is preferably an electric motor. The gear box and electric motor are included in the power assembly 48 referred to above.

For the purpose of swinging the rollers 204 into and out of operative position, one of the units 40, such as the one nearest the driver unit 34 (the left-most one of FIGURE 3) may be provided with a drag link 235 and connected to power means indicated at 236 in FIGURE 8, this power means being operative for selectively rendering the units 34 and 40 oppositely operative and inoperative.

In the connecting together of successive pipe sections, and when the trailing end of the leading section reaches a convenient position, such for example as shown in FIGURE 3 as referred to above, the succeeding section is brought up at a rapid rate of speed for connecting it to the preceding one. For this purpose the endo rollers 204 are brought up into operative position and the spin-up roller 142 in the unit 34 is lowered out of operative position. The power means 236 includes a power device, such as a hydraulic cylinder 238 to the piston of which is connected a rod 240. Connected to the rod is a bell crank lever 242 having an extended arm 246 engageable with the end 133 of the frame 130 of the unit 34. At the extended end of the rod 240 is another lever 248 having its extended arm 250 engageable with the drag link 235. Upon retraction of the piston in the ram 238, both levers 242, 248 are rotated clockwise, the one at the left 242, enabling the frame 130 to be raised under the action of the spring 136, bringing the spin-up roller 142 into engagement with the pipe as shown in dot-dash lines. Rotation of the other lever 248 swings the endo rollers 204 downwardly out of engagement with the pipe as shown in dot-dash lines. Upon extension of the piston, the ram being double acting, the rollers are moved to their opposite positions, namely, the spin-up roller 142 is moved out of engagement with the pipe while the endo rollers 204 are brought up into engagement therewith. For the purpose of bringing the succeeding pipe section 20b up into position, the endo rollers are brought into active position and operated at a fast speed. This arrangement not only lifts the pipe off of the spin-up roller 142, but off the idler roller 63 as well, there being a sufficient number of endo rollers for so lifting the pipe.

The endo rollers 204 (FIGURE 13) are spaced apart sufficiently that the pipe is centered on the two rollers and there is no need for other guiding means to maintain the pipe in proper position, even in the case of extremely large diameter pipe represented in that figure.

When one set of endo rollers 204 represented in FIGURE 8 is swung down to inoperative position, all of the endo rollers in all of the units 40 are swung down simultaneously, through the action of the drive shaft 224. The universal joints 226 enable this action, as does the sliding connection at 228 connecting the drive shaft to the output shaft 230 (FIGURE 7).

The arrangement enables the pipe section to be connected "on the fly" that is, while the leading section is moving in a helical path. In this operation the trailing section is brought up in linear direction, without rotation, to a position closely adjacent the leading section, such as in the neighborhood of two feet, and the endo rollers 204 are moved down out of operative position, and the spin-up roller 142 is moved up into operative position and operated at a rate of speed substantially faster than that of the preceding section. The spin-up roller 142 feeds the trailing section in the proper spiral path so that the wedging connection of the trailing section with the plug 202 is made effectively as the leading section is being moved in a helical path and at the optimum speed. After the connection is made, the spin-up roller 142 is reduced in speed to coincide with that of the rollers in the unit 36. It will be understood that the mechanism represented in FIGURE 8 is diagrammatic, and any suitable means for controlling the units 34 and 40 may be utilized, within the scope of the invention.

While I have herein shown and described a preferred form of the invention, it will be understood that changes may be made therein within the spirit and scope of the appended claims.

I claim:

1. Apparatus of the character disclosed for conveying pipe helically along an axis, comprising means for so moving the pipe and supporting rollers including a plurality of pairs of rollers spaced along said axis, those rollers of each pair being on opposite sides of the vertical plane containing the axis of the pipe, whereby the rollers form means for supporting the pipe, and means for adjusting the rollers of each pair toward and from each other, and consequently thereto, adjusting the rollers about axes perpendicular to the axis of the pipe and thereby aligning the rollers according to different predetermined helical paths.

2. Pipe conveying apparatus according to claim 1 wherein said supporting rollers of each pair are disposed under the axis of the pipe and operative for stably supporting the pipe thereon.

3. Pipe conveying apparatus according to claim 2 wherein the supporting rollers include at least a pair above said axis and engageable with the upper surface of the pipe and thereby cooperate with the lower rollers for supporting pipe.

4. Pipe conveying apparatus according to claim 1 wherein said rollers include a plurality of pairs distributed longitudinally, a common actuating member extends longitudinally and is connected with all of the rollers of said pairs, and common power means is provided for actuating said actuating member for in turn moving the rollers of said pairs as stated.

5. Pipe conveying apparatus according to claim 4 wherein the actuating member includes a rod extending substantially the length of the conveyor and is movable longitudinally, means interconnects the rod and the rollers for moving the rollers as stated in response to longitudinal movement of the rod, and the power means includes means threadedly engaging said rod and upon actuation thereof is operative for moving the rod longitudinally.

6. Pipe conveying apparatus according to claim 5 wherein the rollers are included in roller assemblies, and are moved toward and from each other by moving the roller assemblies in those directions, means is provided for guiding the roller assemblies in lines tranversely of the conveyor in response to movement of those of each set toward and from each other, links interconnect said rod and the roller assemblies which are operative in response to longitudinal movement of the rod for moving the roller assemblies toward and from each other, and cam means is provided and operatively connected with the roller assemblies for moving the rollers about axes perpendicular to the axis of the pipe in response to movement of the roller assemblies toward and from each other.

7. Pipe conveying apparatus according to claim 1 wherein the means for adjusting the rollers angularly about their said axes includes cam means operatively interconnected with the rollers and operative for so adjusting the rollers pursuant to the movement of the rollers toward and from each other.

8. Pipe conveying apparatus according to claim 7 wherein said cam means includes a cam plate for each roller, and the cam plates are removably mounted for enabling interchangeability of different cam plates for effecting correspondingly different adjusting movements of the rollers for accommodating different helical paths of the pipe.

9. Pipe conveying apparatus according to claim 1 wherein a pair of power units are provided for moving the pipe helically, a first one of the units being spaced from the exit end of the conveyor and the second one being adjacent that end, the first one of the units being of variable speed character to enable rapid helical movement of a trailing pipe section relative to a leading pipe section whereby to enable connection of such pipe sections together as they are moving together helically through the conveyor.

10. Pipe conveying apparatus according to claim 1 wherein the means for helically moving the pipe includes a driving roller engaging the pipe, and means is provided for adjusting the driving roller about an axis therethrough and perpendicular to the axis of the pipe for selectively positioning the driving roller for predetermining a helical path of movement of the pipe according to any selective settings of any of the other rollers.

11. Pipe conveying apparatus accoording to claim 10 wherein the driving roller is directly under the pipe, and engagement therewith is provided by gravity action on the pipe.

12. Pipe conveying apparatus according to claim 11 wherein the driving roller is mounted for yielding under the action of the pipe whereby to enable the pipe to rest on others of said rollers while retaining friction driving engagement between the driving roller and the pipe.

13. Pipe conveying apparatus according to claim 12 wherein the means for helically moving the pipe includes a driving unit having a subframe and a driving roller thereon engageable with the pipe, the subframe is pivotally mounted for limited rocking movement for moving the driving roller vertically into and out of friction driving engagement with the pipe, and the driving unit also includes means mounted theron for driving the driving roller.

14. Pipe conveying apparatus according to claim 13 wherein the driving roller is mounted for adjusting movements about a substantially vertical axis, the driving means therefor is fixedly mounted on the subframe, and extensible and universal connection means operatively interconnect the driving means and the driving roller.

15. Pipe conveying apparatus according to claim 1 wherein the supporting rollers are disposed under the pipe and each is incorporated in a roller assembly, each roller assembly includes a bottom portion having a first plate, and a top portion having a second plate supportedly engaging the first plate, and carrying the roller, the roller assemblies being movable toward and from each other transversely of the conveyor, and the second plate being rotatable relative to the first plate and about an axis perpendicular to the axis of the pipe and extending through the roller and thereby correspondingly moving the roller, a cam plate having a camming surface associated with each roller, and said second plate having a radial arm and a cam follower mounted therein operatively engaging said camming surface.

16. Pipe conveying apparatus according to claim 1 wherein said supporting rollers include upper rollers over said axis and engageable with the upper surface of the pipe, means is provided for moving the upper rollers vertically into and out of engagement with the pipe, and means is provided for moving the upper rollers toward and from each other in response to vertical movements thereof whereby to effect engagement with the pipe at substantially the same spacing between the rollers angularly of the pipe independently of the diameter of the pipe.

17. Pipe conveying apparatus according to claim 16 wherein additional means is provided for moving the upper rollers angularly about axes therethrough and perpendicular to the axis of the pipe in response to movement of the rollers toward and from each other whereby to position those rollers to follow helical paths on the pipe according to the positioning of the supporting rollers.

18. Pipe conveying apparatus according to claim 17 and including a frame structure, cam means on the frame structure for moving the upper rollers toward and from each other pursuant to vertical movement thereof, and other cam means for moving the upper rollers about said perpendicular axes pursuant to movement of the rollers toward and from each other.

19. Pipe conveying apparatus according to claim 1 wherein the supporting rollers include a plurality of pairs of lower rollers under the pipe spaced longitudinally and including rollers at the exit end of the conveyor, said supporting rollers include upper hold down rollers engageable with the upper surface of the pipe and positioned anterior to the last lower rollers at the exit end, the means for helically moving the pipe includes a first unit anterior to the hold down rollers and including a driving roller frictionally engaging the under surface of the pipe, and a second unit posterior to said hold down rollers and including a plurality of driving rollers under and frictionally engaging the pipe.

20. Pipe conveying apparatus according to claim 1 wherein means is provided for moving the pipe through the conveyor in a linear direction without rotational movement, and means is provided for selectively activating the means for helically moving the pipe and the means for linearly moving it.

21. Pipe conveying apparatus according to claim 20 wherein both said means for linearly and helically moving the pipe are disposed generally under the pipe, and are selectively, and mutually oppositely, vertically movable for respectively moving each above the other for bringing it into driving engagement with the pipe.

22. Pipe conveying apparatus according to claim 1 wherein the means for linearly moving the pipe includes a plurality of rollers spaced longitudinally, and mounted for swinging movement about transverse axes for moving them vertically, common means is provided interconnecting all of said rollers, and common power means is provided which is operative acting through interconnecting means, for swingingly moving said rollers.

23. Pipe conveying apparatus according to claim 22 wherein the means interconnecting the plurality of linearly moving rollers includes a rotatable shaft operatively connected with the rollers for rotating them, power means is operatively connected with said shaft for rotating all of said linearly moving rollers in unison, universal connector means is operatively interposed between said shaft and the respective rollers, and universal and extensible connector means is interposed betwen said shaft and the driving means therefor.

References Cited
UNITED STATES PATENTS

| | | | |
|---|---|---|---|
| 2,112,865 | 4/1938 | Putnam | 214—338 |
| 2,166,608 | 7/1939 | Postlewaite | 214—1 |
| 2,198,178 | 4/1940 | Postlewaite | 214—338 |
| 2,747,727 | 5/1956 | Morain | 214—339 |
| 2,753,040 | 7/1956 | Rasmussen | 214—339 |
| 3,091,900 | 6/1963 | Whittenberg | 214—338 X |
| 3,207,289 | 9/1965 | Smith | 214—1 X |

EVON C. BLUNK, *Primary Examiner.*

M. L. AJEMAN, *Assistant Examiner.*